United States Patent [19]
LaValley

[11] 3,977,067
[45] Aug. 31, 1976

[54] METHOD AND APPARATUS FOR INDICATING AND ADJUSTING TOE-SETTING

[75] Inventor: Richard A. LaValley, North Branch, Mich.

[73] Assignee: General Motors Corporation, Detroit, Mich.

[22] Filed: Aug. 15, 1975

[21] Appl. No.: 605,151

[52] U.S. Cl. ................................. 29/407; 33/203; 33/203.18; 33/203.2; 73/37.8
[51] Int. Cl.² ........................................ B23Q 17/00
[58] Field of Search .............. 29/407; 73/37.8, 129; 33/203, 203.15, 203.17, 203.18, 203.2, 203.1

[56] References Cited
UNITED STATES PATENTS 3,160,960 12/1964 Voelker .................. 33/203.18 X
3,180,033 4/1965 MacMillan .................. 33/203.2 X
3,182,405 5/1965 Taylor ..................... 33/203.2

FOREIGN PATENTS OR APPLICATIONS
1,330,404 9/1973 United Kingdom ............. 33/203.15

Primary Examiner—Victor A. DiPalma
Attorney, Agent, or Firm—John P. Moran

[57] ABSTRACT

A method and apparatus for indicating and adjusting the toe-setting for a front axle assembly, including means for clamping against oppositely disposed brake backing plate mounting surfaces, with cooperating sensor means for indicating toe-in or toe-out before and during manual adjustment of the tie rod to establish a desired toe-setting.

7 Claims, 5 Drawing Figures

METHOD AND APPARATUS FOR INDICATING AND ADJUSTING TOE-SETTING

This invention relates generally to front end alignment equipment and, more particularly, to equipment and method for indicating and adjusting the toe-setting for a front axle assembly.

It is well known that front wheel toe-in influences the steering stability and riding qualities of the vehicle and has a direct effect on tire wear. Various techniques are currently employed to adjust toe-in with the wheels in place, after the vehicle has been in operation for some time. Also, a number of methods have been used heretofore to set toe-in on the axle assembly line for I-beam type front axles, prior to the mounting of the wheels thereon.

Most of the latter methods reference from the wheel spindles of the front axle assembly, either directly therefrom or indirectly from adaptors mounted on the spindles. Some of these methods involve using a "trambar" extended across front and rear portions of the spindle adaptors; beam fixture gauging off the spindle adaptors; and split image viewers adapted directly to the spindles. These have proved to be less than completely satisfactory from the standpoint that beside the need for adaptors and their inherent tolerance requirements, two operators are generally required, and the operator's judgement has had to be relied upon as to when the alignment is correct.

Accordingly, an object of the invention is to provide an improved method and apparatus for checking, indicating, and adjusting the toe-setting of a front axle assembly.

Another object of the invention is to provide an improved apparatus for checking front axle toe-setting which does not reference from the spindle or from an adaptor mounted thereon, and which may be accomplished by a single operator.

A further object of the invention is to provide an apparatus which references from the brake backing plate mounting surfaces of a front axle assembly for sensing and indicating whether the assembly, including an I-beam type front axle and a tie rod, initially has too much or too little toe-in, with provisions for sensing and indicating any change thereto resulting from manual manipulation of the tie rod.

Still another object of the invention is to provide an apparatus which may, by suitable controls, be lowered by an operator onto the spindles of a front axle assembly, slid inwardly therealong, and clamped against the oppositely disposed brake backing plate mounting surfaces, whereupon air-sensing means sense the actual toe-in relationship between the two mounting surfaces, and signal visual indicators accordingly which indicate such toe-in relationship to the operator, and continue to sense and indicate any changes resulting from the operator's rotation of the tie rod, thereby changing the toe-in relationship between the two mounting surfaces, prior to tightening the tie rod at the desired setting, and unclamping and lifting the apparatus from the front axle assembly.

These and other objects and advantages of the invention will be apparent when reference is made to the following description and accompanying drawings, wherein.

Figure 2:
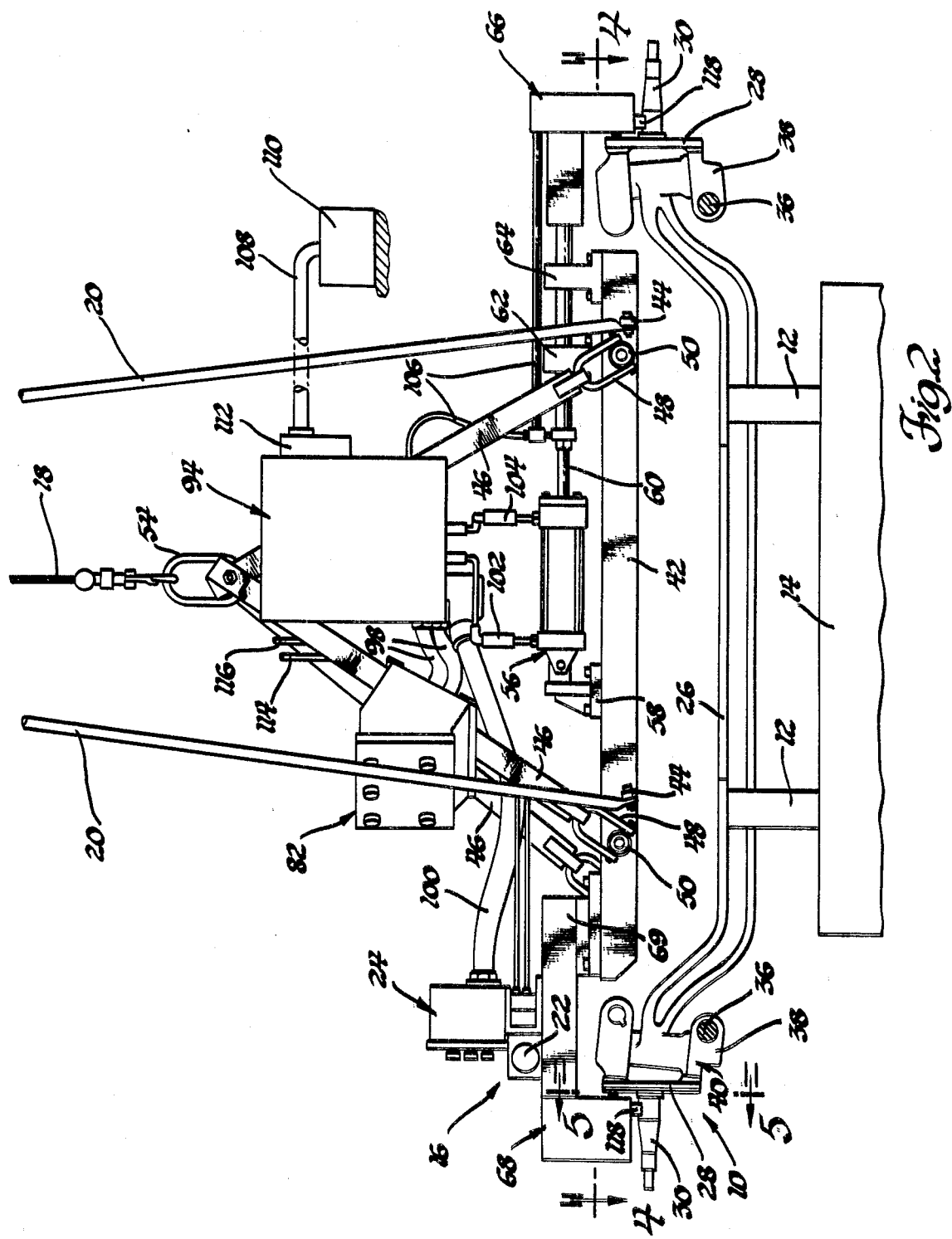
FIG. 2 is a rear view of the assembly and apparatus of FIG. 1, with the apparatus in operative position on the assembly.
Figure 3:
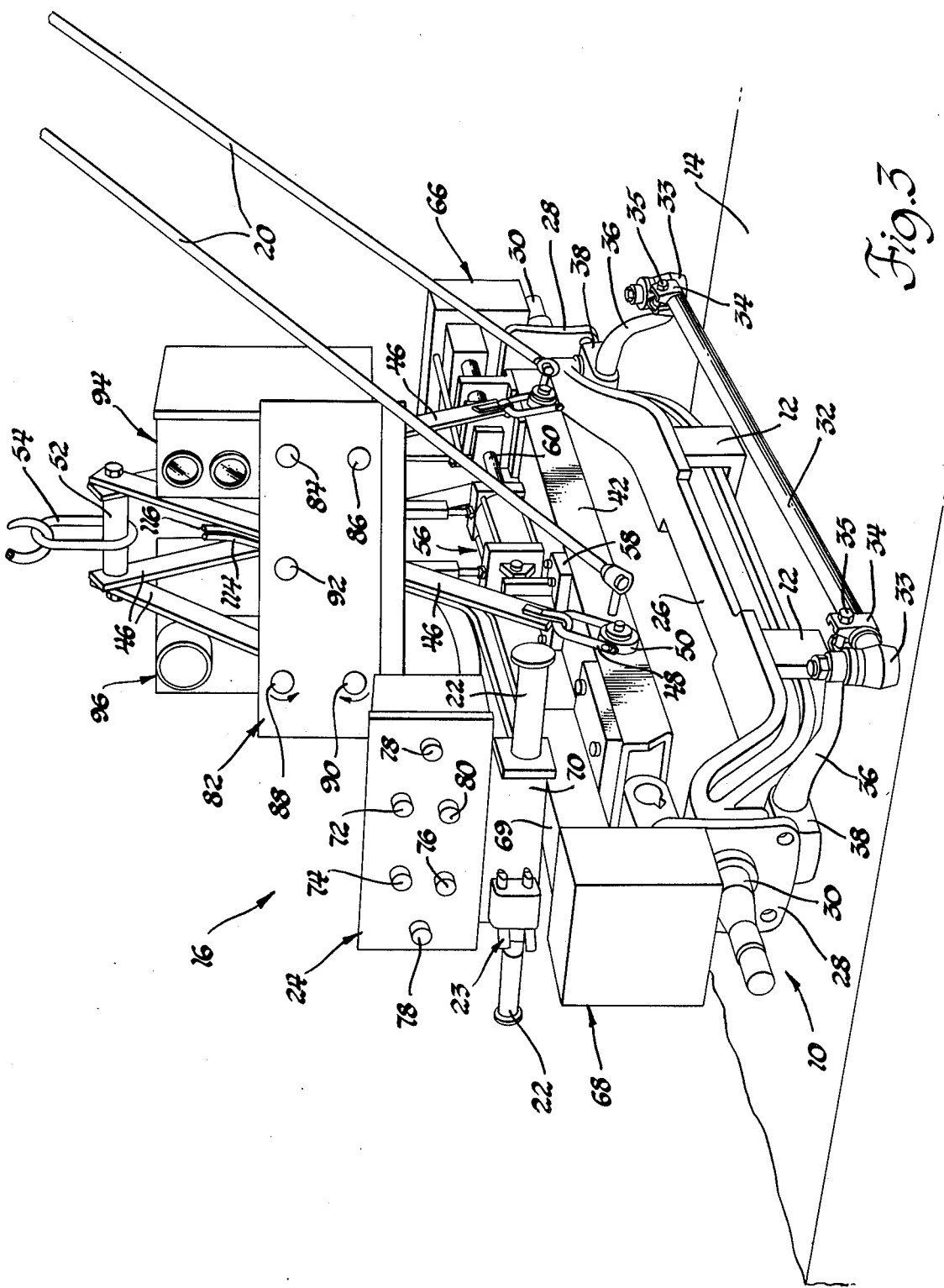
Figure 4:
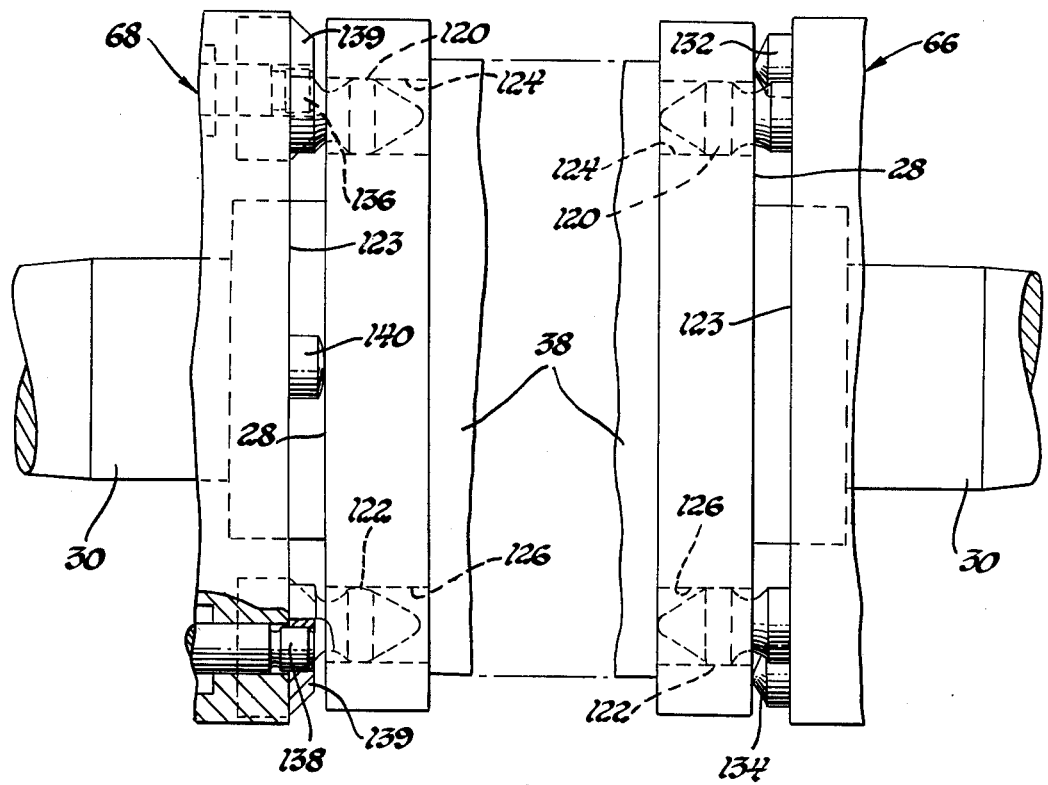
Figure 5:
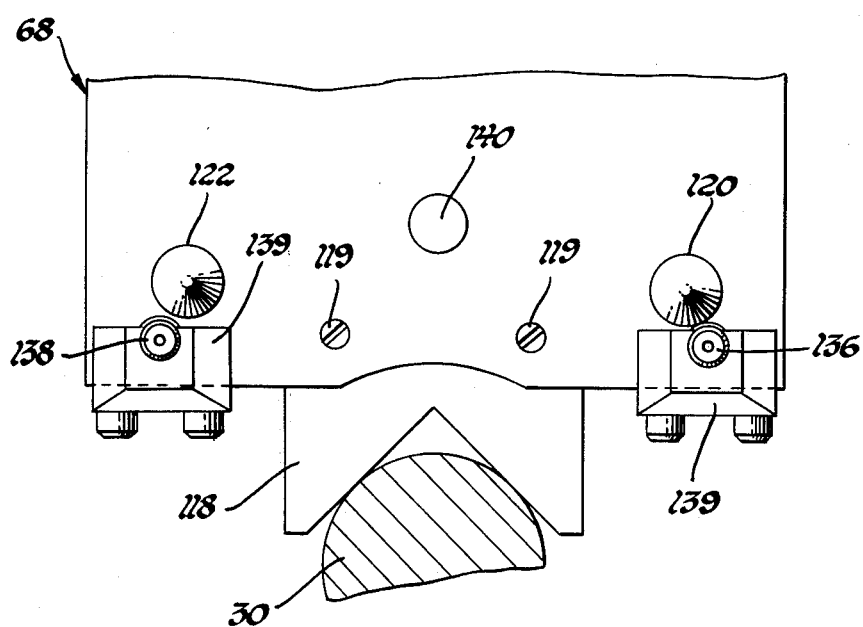

FIG. 3 is a perspective view of the FIG. 2 arrangement and including a complete front axle assembly; and FIGS. 4 and 5 are fragmentary enlarged cross-sectional views taken along the planes of lines 4—4 and 5—5 of FIG. 2, respectively, and looking in the direction of the arrows.

Figure 1:
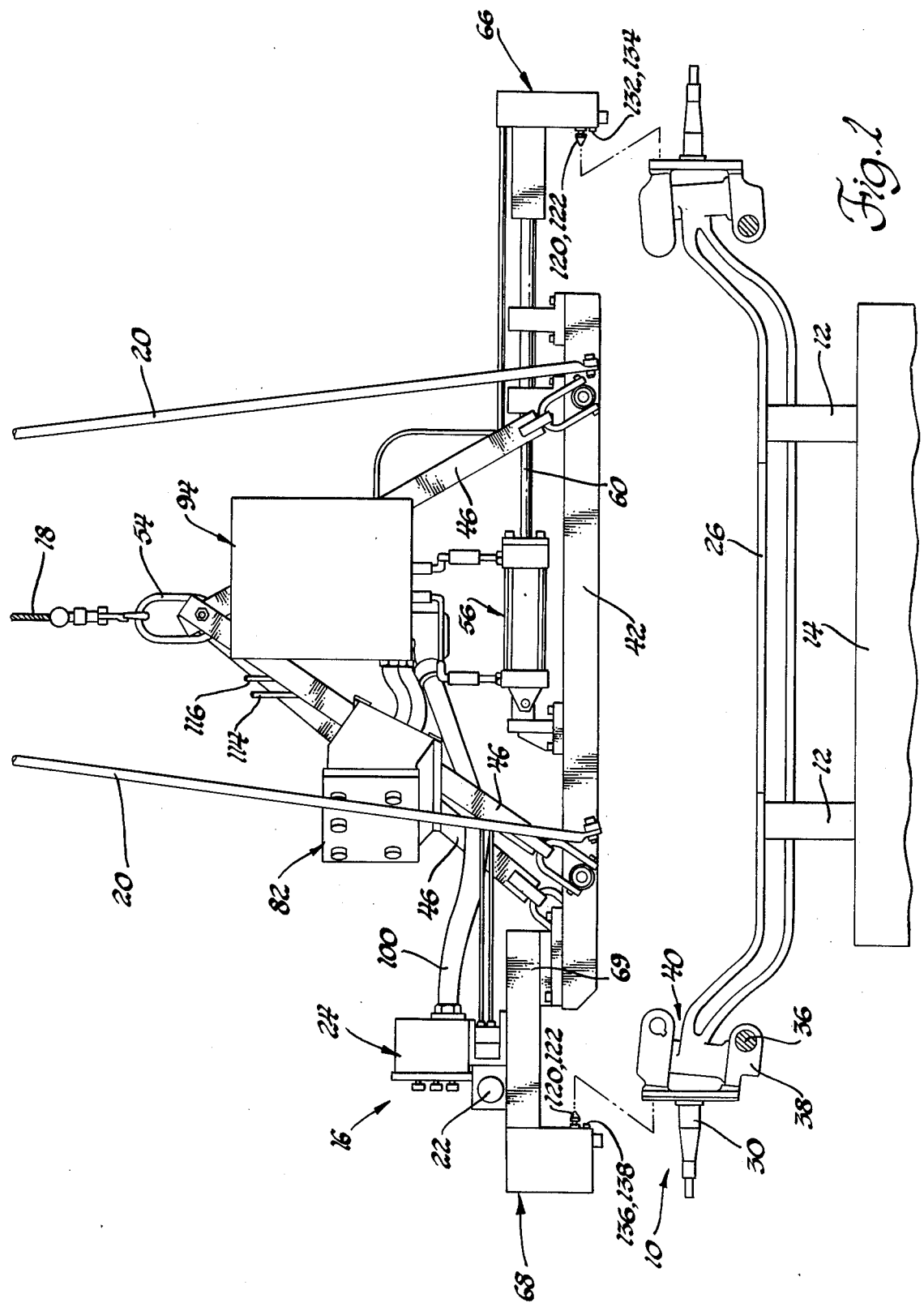
FIG. 1 is a rear view of a vehicular front axle assembly with portions thereof omitted, and an apparatus embodying the invention for determining and indicating the toe-setting therefor, with the latter in an inoperative overhead location.

Referring generally to the drawings, FIG. 1 illustrates a front axle assembly 10 mounted on support posts 12 secured to a suitable conveyor 14. An apparatus 16 for determining and indicating the toe-setting of the front axle assembly 10 is shown supported by a cable 18 extending from a suitable overhead hoist and track [not shown] and positioned just above the path of one front axle assembly 10 of a series of spaced assemblies 10, each being conveyed by the conveyor 14 to a location directly beneath the apparatus 16. Stabilizer arms 20 serve to prevent the apparatus 16 from tilting while in the operative position.

In FIG. 2, the apparatus 16 is shown lowered into its operative position on the front axle assembly 10. FIG. 3 illustrtes the apparatus in its operative position on the assembly 10, as it would be viewed by an operator who would have first lowered the apparatus 16 via oppositely disposed handlebars 22 and hoist-actuating controls 23 adjacent the left handlebar 22, and then guides the apparatus into place by using a clamping control panel 24, as will be explained.

Referring now to FIGS. 2 and 3 in greater detail, it may be noted that the front axle assembly 10 includes a conventional I-beam type front axle 26 supported by the posts 12, with a brake backing plate mounting surface 28 and associated wheel mounting spindle 30 formed on each end thereof, the surface 28 being machined perpendicular to the axis of the spindle 30. A tie rod 32 (FIG. 3) is supported adjacent its tie rod ends 33 by brackets 34 secured by suitable fasteners, such as bolts 35, to tie rod arms 36 extending from the bottom portion 38 of the usual steering knuckle 40.

The apparatus 16 for determining and indicating toe-setting includes a base member 42, to one side of which the stabilizer arms 20 are secured by suitable fasteners 44, and to opposite sides of which two pairs of support links 46 are spread apart and secured at the lower ends thereof by suitable brackets 48 and fasteners 50. The support links 46 are overlapped at the upper ends thereof and secured in pairs on opposite ends of a bar 52 (FIG. 3) which is supported by a ring 54 connected to the hoist cable 18.

An air or other type clamp cylinder 56 is secured at one end thereof by a mounting bracket 58 to the top substantially central portion of the base member 42. A piston rod 60 extends from the cylinder 56 through aligned support blocks 62 and 64 to a first clamping mechanism 66 extended beyond one end of the base member 42. A second clamping mechanism 68 includes an extension block 69 secured to the other end of the base member 42 so as to locate the clamping mechanism 68 a predetermined fixed distance beyond such other end. The handlebars 22 and the actuating controls 23 are supported on a bracket 70 secured to the top surface of the extension block 69. The clamping control panel 24 is mounted on the top surface of the bracket 70, exposing to the operator an "off-on" control switch 72, a "clamp" button 74, an "unclamp" button 76, stamp buttons 78 and a two-position switch 80, the latter having one position for "normal" operation, and another position for "set-up" operation, as will be explained.

A condition panel 82 is mounted on the outer edges of two oppositely disposed support links 46, so as to expose to the operator five suitable signal devices, for example: red and green spheres serving, respectively, as "right front in position" signal 84; "right rear in position" signal 86; "too much toe-out" signal 88 "too much toe-in" signal 90; and "OK to unclamp" signal 92. Suitable regulators, valves, relays, gauges, and fluidic circuitry [not shown] are included in two balanced master control panels 94 and 96 mounted on opposite sides of the two pairs of support links 46. Suitable conduitry, such as lines 98, 100, 102, 104, and 106 communicate air from the master control panels 94 and 96 to the condition panel 82, the clamping control panel 24 and the second clamping mechanism 68, the secured end of the cylinder 56, the piston rod end of the cylinder 56, and the first clamping mechanism 66, respectively. A main air-line 108 extends from a source of air, represented at 110, via suitable filter means 112, to the master control panel 94, for selective actuation of the above components. A pair of air-lines 114 and 116 serve to interconnect the hoist-actuating controls 23 and the hoist [not shown] in the usual manner.

Referring now to FIGS. 4 and 5, it can be determined that the first and second clamping mechanisms 66 and 68, respectively, each have an inverted V-block 118 secured thereto by suitable fasteners 119 so as to extend from the bottom surface thereof for mounting on oppositely disposed spindles 30 of the front axle assembly 10.

A pair of guide pins 120 and 122 are secured to the inner face 123 of each of the clamping mechanisms 66 and 68, adapted for entering respective upper mounting holes 124 and 126 formed in each of the brake backing plate mounting surfaces 28.

As may be noted in FIG. 4, a pair of fixed air sensors 132 and 134 are mounted on the first clamping mechanism 66 for abutment against the adjacent brake backing plate mounting surface 28 and, as seen in FIGS. 4 and 5, a pair of cone jet gap air sensors 136 and 138 are mounted on the second clamping mechanism 68, protected by guards 139 and retained apart from the adjacent mounting surface 28 by virtue of a pivot pin 140 formed on the clamping mechanism 68 intermediate the sensors 136 and 138. The distance between the surface 28 and the outlets of the adjacent sensors 136 and 138 is variable, as will be explained.

In operation, once the front axle assembly 10 is moved by the conveyor 14 to a location directly beneath the toe-setting indicating apparatus 16 (FIG. 1), the operator lowers the apparatus until the inverted V-blocks 118 mount on the respective spindles 30 of the axle assembly 10. The operator then actuates the air cylinder 56 by contacting the clamp button 74 (FIG. 3). The piston rod 60 thereupon pulls the first clamping mechanism 66 toward the operator until the guide pins 120 and 122 enter the respective mounting holes 124 and 126 and the fixed air sensors 132 and 134 come into contact with the brake backing plate mounting surface 28, pivoting the latter as required for contact by both sensors, thus substantially shutting off the flow of any air from the sensors 132 and 134. Further actuation of the cylinder 56 causes the pivot pin 140 to contact the other brake backing plate mounting surface 28, allowing the air flowing from the cone jet gap air sensors 136 and 138 to react against the surface 28, sending a signal reflective of the respective gaps or distances therebetween to the control components of the master control panels 94 and 96.

Referring now to the condition panel 82 of FIG. 3, the signals 84 and 86 thereof indicate that the sensors 132 and 134 of the first clamping mechanism 66 are in place, abutted against the adjacent brake backing plate mounting surface 28. If, for example, the sensors 136 and 138 are positioned such that the sensor 136 is less than a predetermined distance of, say 0.125 inch, from the adjacent surface 28, and the other sensor 138 is more than the predetermined distance from the surface 28, the signal 88 would indicate too much toe-out; whereas, if the sensors 136 and 138 were positioned in the opposite relationship with the surface 28, the signal 90 would indicate too much toe-in.

In response to such signals, the operator grasps the tie rod 32 (FIG. 3) and rotates it as required to threadedly move the arms 36 either toward each other or away from each other, as required—all of such movement being evident at the brake backing plate mounting surface 28 closer to the operator, pivoting about the pivot pin 140, inasmuch as the sensors 132 and 134 are abutted against the surface 28 on the end opposite the operator. Once the predetermined setting of, say, 0.125 inch, is attained for each sensor 136 and 138, both signals 88 and 90 will be green, for example, and the OK to unclamp signal 92 will be actuated. In other words, only after all four signals 84, 86, 88, and 90 indicate the desired predetermined relationships with the respective surfaces 28, will the fifth signal 92 be actuated.

The operator thereupon tightens the bolts 35 to maintain the now correct relationship between the tie rod 32 and arms 36, prior to actuating the unclamp button 76, which causes the first clamping mechanism 66 and its guide pins 120 and 122 and air sensors 132 and 134 to withdraw from the mounting surface 28 and permits the operator to manually withdraw the second clamping mechanism 68 directly in front of him, along with its guide pins 120 and 122 and sensors 136 and 138 from the adjacent mounting surface 28.

The apparatus is then lifted from the front axle assembly 10 by the operator's actuation of the hoist-actuating controls 23, ready for the next cycle.

If desired, suitable stamping means [not shown] could be incorporated for marking each assembly 10, after the desired toe-setting is attained and prior to actuating the unclamp button 76. Such stamping equipment could be arranged so that both of the operator's hands would be required to actuate the two stamp buttons 78 located at opposite edges of the control panel 24.

Referring now to the clamping control panel 24, it should be explained that, with the two-position switch 80 set for normal operation, the components of the master control panels 94 and 96 are selected such that, should any one of the two sets of guide pins 120 and 122 not enter its respective mounting hole 124 or 126, the first clamping mechanism 66 would be caused to withdraw to its original inoperative position. Should that happen, for the sake of convenience, the two-position switch 80 could be turned by a key [not shown] to its set-up position, whereupon the master controls of the panels 94 and 96 are such that, in response to actuation of the clamp button 74, the cylinder 56 will stop in place once a guide pin 120 and 122 contacts an obstruction, and the operator can more readily determine what the problem is, such as incorrectly located mounting holes 124, 126, for example.

It should be apparent that the invention provides a simplified and efficient means by which a single operator may readily check the toe-setting of a front axle assembly by referencing from the brake backing plate mounting surfaces thereof, and be advised as to which direction the tie rod must be rotated to arrive at a predetermined desired setting.

It should also be apparent that the master control panels 94 and 96 could house other suitable control components, such as electrical controls and circuitry, in lieu of the above referenced air controls and circuitry, with suitable sensitive micro-switches being used in lieu of the sensors 132, 134, 136, and 138.

While but one embodiment of the invention has been shown and described, other modifications thereof are possible.

I claim:

1. A method for indicating and adjusting the tow-setting of a front axle assembly including a front axle having a steering knuckle including a brake backing plate mounting surface and an associated spindle pivotally mounted on each end thereof, and a tie rod operatively connected between the brake backing plate mounting surfaces and adapted to change the relative angularity of the brake backing plate mounting surfaces upon selective manual rotation of the tie rod, said method comprising the steps:
   a. mounting a pair of spaced relatively movable reference plates, each having sensors mounted thereon, on the spindles on the outboard side of the brake backing plate mounting surfaces;
   b. slidably moving the reference plates along the spindles toward each other until the sensors operatively contact the brake backing plate mounting surfaces and activate visual indicator means indicative of the spatial positions of the brake backing plate mounting surfaces relative to the spatial positions of the reference plates;
   c. rotating the tie rod to selectively adjust the relative spatial positions of the brake backing plate mounting surfaces relative to the reference plates until the desired toe-setting relationship is indicated by the visual indicators; and
   d. securing the tie rod in adjusted position to maintain the desired toe-setting relationship.

2. A method for indicating and adjusting the toe-setting of a front axle assembly including a front axle having a steering knuckle including a brake backing plate mounting surface and an associated spindle pivotally mounted on each end thereof, and a tie rod operatively connected between the brake backing plate mounting surfaces and adapted to change the relative angularity of the brake backing plate mounting surfaces upon selective manual rotation of the tie rod, said method comprising the steps:
   a. mounting a pair of spaced relatively movable reference plates, each having a pair of sensors mounted thereon and one having a pivot pin formed thereon intermediate the pair of sensors, on the spindles on the outboard side of the brake backing plate mounting surfaces;
   b. slidably moving the reference plates along the spindles toward each other until the sensors of one reference plate and the pivot pin of the other reference plate contact the respective brake backing plate mounting surfaces and activate visual indicator means indicative of the spatial positions of one brake backing plate mounting surface relative to the respective spatial positions of the pair of sensors adjacent the pivot pin;
   c. rotating the tie rod to selectively pivot the brake backing plate mounting surface about the pivot pin, relative to the respective spatial positions of the adjacent pair of sensors, until the desired toe-setting relationship is indicated by the visual indicators; and
   d. securing the tie rod in adjusted position to maintain the desired toe-setting relationship.

3. A method for indicating and adjusting the toe-setting of a front axle assembly including a front axle having a steering knuckle including a brake backing plate mounting surface and an associated spindle pivotally mounted on each end thereof, and a tie rod operatively connected between the brake backing plate mounting surfaces and adapted to change the relative angularity of the brake backing plate mounting surfaces upon selective manual rotation of the tie rod, said method comprising the steps:
   a. mounting a pair of spaced relatively movable reference plates, each having a pair of air sensors mounted thereon and one having a pivot pin forming thereon intermediate the pair of air sensors, on the spindles on the outboard side of the brake backing plate mounting surfaces;
   b. slidably moving the reference plates along the spindles toward each other until one pair of air sensors abuts against the adjacent brake backing plate mounting surface and the other pair of air sensors is spaced apart from the adjacent brake backing plate mounting surface as a result of the intermediate pivot pin abutting against the adjacent brake backing plate mounting surface, the air sensors thereby activating visual indicator means indicative of the respective positions of the brake backing plate mounting surfaces relative to the respective positions of the two pairs of air sensors;
   c. rotating the tie rod to selectively adjust the relative positions of the brake backing plate mounting surface and the pair of spaced apart air sensors, pivoting the adjacent brake backing plate mounting surface about the pivot pin until the desired toe-setting relationship is indicated by the visual indicators; and
   d. securing the tie rod in adjusted position to maintain the desired toe-setting relationship.

4. A method for adjusting the toe-setting of a front axle assembly including a front axle having a steering knuckle including a brake backing plate mounting surface and an associated spindle pivotally mounted on each end thereof, and a tie rod operatively connected between said brake backing plate mounting surfaces and adapted to change the relative angularity of said brake backing plate mounting surfaces upon selective manual rotation of the tie rod, said method comprising the steps:
   a. providing relatively movable oppositely disposed clamping means, each having position sensors mounted thereon;
   b. providing visual indicators responsive to signals from said sensors for indicating the relative positions of, and, hence, the toe-in relationship between said brake backing plate mounting surfaces;

c. mounting said relatively movable oppositely disposed clamping means on respective spindles;

d. slidably moving said clamping means along said spindles until said sensors operatively contact said brake backing plate mounting surfaces;

e. manually rotating said tie rod to selectively adjust the relative toe-in positions of said brake backing plate mounting surfaces with respect to said sensors, until the desired toe-setting relationship is indicated by said visual indicators; and f. securing said tie rods in adjusted position to maintain the desired toe-setting relationship.

5. For use with a front axle assembly including a front axle having a steering knuckle including a brake backing plate mounting surface and an associated spindle pivotally mounted on each end thereof, and a tie rod operatively connected between the brake backing plate mounting surfaces and adapted to change the relative angularity of the brake backing plate mounting surfaces upon selective rotation of the tie rod, thereby adjusting toe-in relationship of the brake backing plate mounting surfaces, a toe-setting indicating machine comprising a base plate, relatively movable first and second reference plates slidably mounted on opposite ends of said base plate, a pair of sensors mounted on each of said first and second reference plates, means for mounting each of said first and second reference plates on said spindles, control means for moving said reference plates along said spindles causing said sensors to operatively contact respective brake backing plate mounting surfaces, a condition panel mounted adjacent said control means including a set of visual indicators mounted thereon for indicating in response to signals from said sensors the spatial position of said brake backing plate mounting surfaces with respect to the spatial position of said sensors, said relative positions and said signals changing in response to rotation of said tie rods.

6. For use with a front axle assembly including a front axle having a steering knuckle including a brake backing plate mounting surface and an associated spindle pivotally mounted on each end thereof, and a tie rod operatively connected between the brake backing plate mounting surfaces and adapted to change the relative angularity of the brake backing plate mounting surfaces upon selective rotation of the tie rod, thereby adjusting toe-in relationship of the brake backing plate mounting surfaces, a toe-setting indicating machine comprising a base plate, a first clamping member slidably mounted on one end of said base plate, a second clamping member secured to the other end of said base plate, a cylinder mounted at an intermediate location along said base plate and operatively connected to said first clamping member, a pair of sensors mounted on oppositely disposed surfaces of each of said first and second clamping members, an inverted V-block formed on the bottom of each of said first and second clamping members for mounting on said spindles, a control panel including control means mounted thereon or actuating said cylinder for clamping and unclamping said first and second clamping members against respective brake backing plate mounting surfaces, a condition panel mounted adjacent said control panel including a set of visual indicators mounted thereon for indicating the direction that said tie rod must be rotated to relatively change the position of said brake backing plate mounting surfaces with respect to said sensors to thereby establish the desired toe-setting, and a master control panel for regulating the power to said sensors for actuating said respective visual indicators in response to signals from said sensors indicative of the position of said brake backing plate mounting surfaces with respect to the position of said sensors, said signals varying in response to rotation of said tie rods.

7. For use with a front axle assembly including a front axle having a wheel supporting member formed on each end thereof, a generally vertical opening formed through the wheel supporting member, an end portion of the axle being pivotally mounted on the wheel supporting member via a kingpin mounted through the opening, a spindle extending substantially horizontally from each wheel supporting member, a brake backing plate mounting surface formed on each wheel supporting member perpendicular to the axis of the spindle and having mounting holes formed in the upper half thereof, a laterally extending tie rod arm formed on the lower portion of each wheel supporting member, a tie rod end secured to the end of each tie rod arm, and a tie rod threadedly connected between the tie rod ends and adapted to converge or spread the tie rod arms upon selective rotation of the tie rod, thereby adjusting toe-in of the brake backing mounting surfaces, a toe-setting machine comprising a base plate, a first intermediate member slidably mounted on one end of the base plate, a second clamping member secured to the other end of the base plate, a cylinder mounted at an intermediate location along the base plate and operatively connected to the first clamping member, a pair of guide pins and a pair of air sensors mounted on oppositely disposed surfaces of each of the first and second clamping members, the guide pins being adapted to fit into the mounting holes formed in the upper half of each brake backing plate mounting surface, a pivot pin formed on the second clamping member intermeidate the air sensors thereof, an inverted V-block formed on the bottom of each of the first and second clamping members for mounting on the horizontally extending spindles, a pair of handlebars mounted on the second clamping member, an operator control panel mounted adjacent the handlebars and including control buttons mounted thereon for clamping and unclamping operations, a condition panel mounted adjacent the control panel including a set of visual indicators mounted thereon, and a master control panel for regulating the air to the air sensors and for actuating respective visual indicators in response to signals from the air sensors to indicate the direction that the tie rod must be rotated to relatively converge or spread the tie rod arms thereby pivoting the second brake backing plate mounting surface about the pivot pin and adjusting the relationship between the latter surface and the adjacent air sensors to establish desired toe-setting, as indicated by the visual indicators.

* * * * *

UNITED STATES PATENT AND TRADEMARK OFFICE
CERTIFICATE OF CORRECTION

PATENT NO. : 3,977,067
DATED : August 31, 1976
INVENTOR(S) : Richard A. LaValley It is certified that error appears in the above—identified patent and that said Letters Patent are hereby corrected as shown below:

Column 7, line 63, "or" should read -- for --.

Column 8, lines 33 and 34 "intermediate" should read -- clamping --.

Column 8, line 44, "intermeidate" should read -- intermediate --.

Signed and Sealed this

Twenty-first Day of December 1976

[SEAL]

Attest:

RUTH C. MASON
*Attesting Officer*

C. MARSHALL DANN
*Commissioner of Patents and Trademarks*